Patented Aug. 20, 1940

2,211,951

UNITED STATES PATENT OFFICE 2,211,951

ARTIFICIAL CELLULOSIC MATERIAL BONDED TO RUBBER AND METHOD OF PRODUCING THE BOND

Albert Hershberger, Kenmore, N. Y., assignor, by mesne assignments, to E. I. du Pont de Nemours & Company, Wilmington, Del., a corporation of Delaware No Drawing. Application April 11, 1936, Serial No. 73,931

12 Claims. (Cl. 154—40)

This invention relates to the treatment of cellulosic materials to improve the adhesion thereto to natural rubber, compounded rubber, rubber substitutes and the like. More particularly, it relates to methods for obtaining improved adhesion between rubber and cellulosic threads, filaments, cords, fabrics and the like, and the products resulting from such methods. This invention is especially applicable to artificial threads as will be explained more in detail below.

In the past it has been found that artificial threads such as regenerated cellulose threads, filaments, cords and the like, adhere very poorly to compounded rubber stock when the two are united and the rubber stock is subsequently cured according to any of the known processes which produce commercially satisfactory adhesion between rubber and cotton. This poor adhesion of artificial threads to rubber has constituted a very serious obstacle to their use in place of cotton in the manufacture of automobile tires, reinforced rubber belts, and similar products consisting of alternate plies of rubber and cord which are required to adhere very strongly for long periods of time, under drastic conditions of high temperature, constant flexing and bending, shock, etc. Artificial threads would frequently be preferable to cotton in such use because of their continuous filament structure. If rayon cord, for example, is pressed into a commercial rubber stock such as is customarily used in the manufacture of tires and belting, and the whole is cured at high pressure and at an elevated temperature sufficient to completely vulcanize the rubber stock, it will be observed that the rayon cord can be pulled away from the rubber with comparative facility. Indeed, if subjected to a standard pull-out test which measures the force required to separate the cord from the rubber, rayon cord is found to adhere to rubber only approximately half as well as a similar cotton cord submitted to the same test.

It has now been discovered that certain compounds, when applied to rayon cord, will very greatly improve its adhesion to rubber. It has also been found that the adhesion of rayon cord to rubber is still further improved if the said compound is combined with a dispersion of rubber or latex or a solution of rubber, and applied to the cord. This invention enables the production of a rayon-reinforced rubber structure that is at least equal to and usually better, insofar as adhesion of the cord to the rubber is concerned, than similar rubber structures reinforced with untreated cotton.

It is an object of this invention to provide a method of securing improved adhesion between cellulosic material and rubber.

It is another object of this invention to provide a method for securing improved adhesion between rayon or other filamentous forms of regenerated cellulose and rubber.

A still further object of this invention relates to the production of artificial threads and plied structures made therefrom such as cords, comprising regenerated cellulose threads having a dry tenacity at room temperature (75° F.) in excess of two grams per denier characterized in that the rayon may be more firmly anchored to rubber reinforced with said threads and/or plied structures.

Other objects of the invention will appear hereinafter.

The objects of the invention are accomplished in general by applying to cellulosic structures such as cellulosic threads and the like, a treating composition comprising an aqueous solution of an insoluble, infusible interpolymeric synthetic resin either alone or in combination with dispersed rubber or rubber latex, and drying the structure so treated whereby to greatly improve the adhesion between the cellulosic thread and rubber after their combination and vulcanization of the rubber, the adhesion being at least as good as the adhesion between untreated cotton and rubber after vulcanization, and from two to three times as good as that between untreated rayon threads and rubber after vulcanization.

In order to set forth more clearly and concisely the principles of the invention, it will be described with particular reference to rayon made by the viscose process and having a high dry tensile strength at room temperature (75° F.) of 2.0 grams or more per denier, and preferably of 2.5 grams or more per denier in the form of heavy cord. It is to be understood, however, that although the preferred form of artificial thread, employed by this invention, is strong rayon produced by the viscose process, the invention contemplates the treatment of any continuous filament cellulosic thread or filament structure produced by a wet process, that is to say, by coagulation from an aqueous cellulosic solution into an aqueous coagulating bath, for example, regenerated cellulose rayon made according to the cuprammonium or viscose process, cellulose esters such as lowly esterified cellulose acetate, of lowly etherified cellulose ethers such as lowly etherified glycol cellulose, lowly etherified methyl cellulose, lowly etherified ethyl cellulose, cellulose glycollic acid or the like.

The invention includes cords and fabrics of any type of construction made from cellulosic threads or filaments. Obviously, where a cellulose derivative, such as cellulose acetate, which is thermoplastic in nature, is used, the temperature to which the material is subjected in various steps of the process must be kept well below the softening point of the cellulose derivative. Furthermore, the materials with which the derivative is treated, must be so chosen that the steps of the process can be carried out at a temperature below the softening point of the cellulose derivative.

The preferred cellulosic material used in this invention is in the form of strong viscose rayon threads having a dry tensile strength at room temperature (75° F.) of above 2.0 grams per denier, prepared in a manner taught by H. H. Parker in his copending patent application Serial No. 676,463, filed June 19, 1933, or in the form of twisted structures, such as strands or cords plied to said strong rayon thread.

As the rubber to which said cellulosic thread structures will adhere the invention contemplates any compounded natural rubber stock or any compounded synthetic rubber stock such as polymerized isoprene, or polymerized butadiene, or polymerized halogen substituted butadiene such as halogen-2-butadiene-1,3 polymer, e. g. chloro-2-butadiene-1,3 polymer, and other types.

Moreover the rubber may contain any desired vulcanizers, stabilizers, accelerators, etc., singly or in any desired combination. In its preferred and common form the invention contemplates any commercial compounded rubber stock such as is commonly employed in the fabrication of automobile tires, hose, raincoat material, shoes, belting such as conveyor belts, fan belts, or other driving belts, or the like.

The term "rubber" unless otherwise modified, as used in the specification and claims, is intended to be used in its generic sense to include rubber substitutes, natural rubber, compounded rubber, synthetic rubber, and the like.

As the means for improving the adhesion of the cellulosic thread structure to rubber this invention contemplates a substantially insoluble, infusible interpolymeric synthetic resin preferably together with dispersed natural or synthetic rubber or rubber latex. The interpolymeric synthetic resins suitable for this invention are preferably resins formed by the reaction between an aldehyde and a mixture of a polyphenol and any other compound which is capable of condensing or polymerizing with an aldehyde to an insoluble, infusible form, all of which resin forming materials are water soluble at least to the extent of 2 to 5% by weight and capable of condensing, polymerizing or setting up rapidly and completely to a substantially insoluble, infusible interpolymeric synthetic resin with or without a catalyst or condensing agent at a temperature of 250° F. or less such as cord is generally subjected to during the drying and vulcanizing or curing operations in the manufacture of tires, fan belts and the like.

As the polyphenols possessing these qualifications and therefore particularly satisfactory for use in the operation of this invention may be mentioned those having the hydroxyl groups in the benzene nucleus meta with respect to one another such as resorcinol, phloroglucinol, orcinol and similar compounds. The preferred concentration of polyphenol is between 0.5 and 5% by weight. It is understood that the invention is not limited to these specific polyphenols.

As the compounds to be used in combination with a polyphenol and capable of condensing or polymerizing with an aldehyde to an insoluble, infusible form and particularly satisfactory for use in the operation of this invention may be mentioned mono-hydric phenols, ketones, aromatic amines, cyanamide or similar amides, urea or urea derivatives, etc.

As the mono-hydric phenols particularly suitable for use in the operation of this invention may be mentioned phenol, m-cresol, xylenol and the like.

As the ketones particularly suitable for use in the operation of this invention may be mentioned simple aliphatic ketones such as acetone, mixed aliphatic ketones such as methyl ethyl ketone, hydroxy aliphatic ketones such as diacetone alcohol, aromatic ketones such as benzophenone, mixed aliphatic-aromatic ketones such as phenyl methyl ketone, hydroxy aromatic ketones such as p-dihydroxy benzophenone and other organic compounds containing the ketone group.

As the aromatic amines particularly suitable for use in the operation of this invention may be mentioned amine derivatives of benzene such as aniline, dimethyl aniline, p-amino aniline, phenylene diamine, diphenyl amine and the like. Likewise amine derivatives of naphthalene are suitable for use in the operation of this invention such as B-naphthyl dimethyl amine, diamino naphthyl amine and B-naphthyl amine.

As the urea derivatives particularly suitable for use in the operation of this invention may be mentioned urea, thiourea, dimethylol urea, alkyl derivatives of urea such as methyl or ethyl urea, acyl derivatives of urea such as acetyl urea and other urea derivatives.

As the amides similar to cyanamide particularly suitable for use in the operation of this invention may be mentioned dicyandiamide, cyanoacetamide, alkyl cyanamides such as methyl or ethyl cyanamide, alkyl melamides such as trimethyl melamine and other amides.

The preferred concentration of mono-hydric phenol, ketone, aromatic amine, amide or urea derivative is between 0.5% and 5% by weight. It is understood that these mono-hydric phenols, ketones, aromatic amines, amides or urea derivatives may be used singly or in any desired combination with the polyphenol and also that this invention is not limited to the specific mono-hydric phenols, ketones, aromatic amines, amides or urea derivatives mentioned.

Polyphenols, mono-hydric phenols, ketones, aromatic amines, amides or urea derivatives having a lower solubility than 2% by weight for example can be employed in the form of aqueous dispersions. Polyphenols, mono-hydric phenols, ketones, aromatic amines, amides or urea derivatives which react rather slowly with aldehydes at the temperatures commonly used in this invention can often be caused to partially condense or polymerize with the aldehyde before application to the rayon thus lessening the time subsequently necessary for substantially complete polymerization. Moreover if desirable the time or temperature or both of drying the cord after passing through the aqueous solution of resin forming materials or the time or temperature or both of curing or vulcanization may be varied from those ordinarily used in manufacturing tires, fan belts and the like in order to insure complete condensation or polymerization of less readily reactive resin forming combinations. It is, however, easily possible and usually preferable according to this invention to select for use in improving adhesion, resin forming materials which can be satisfactorily applied to current commercial processes without necessitating any essential changes in procedure.

Commonly formaldehyde is the aldehyde used but any aldehyde satisfying the foregoing qualifications as to water solubility and time and temperature for complete polymerization with the polyphenol and additional compound capable of polymerizing with an aldehyde to a substantially insoluble, infusible resin is contemplated by this invention. For example, acetaldehyde or crotonaldehyde may be substituted for formaldehyde either wholly or in part. Likewise, instead of formaldehyde materials may be used which yield formaldehyde such as for example hexamethylenetetramine. Furthermore, certain reaction products of formaldehyde which will condense or polymerize with polyphenols and additional compounds capable of polymerizing with an aldehyde may be used such as for example the reaction product of formaldehyde and dimethyl amine. Moreover modifications in the method of procedure such as have been discussed in connection with the choice of polyphenols and additional compounds capable of polymerizing with an aldehyde may make possible the use of still other aldehydes which would not commonly be suitable because of low water solubility or slowness in polymerizing completely with the polyphenol and additional compound capable of polymerizing with an aldehyde to a substantially infusible, insoluble resin. The aldehyde is used preferably in amounts such that the aqueous solution contains 1 to 2 mols of aldehyde per mol of polyphenol and additional compound capable of polymerizing with an aldehyde present.

Usually it is desirable to add to the aqueous solution of resin forming materials containing a polyphenol and additional compound capable of polymerizing with an aldehyde and an aldehyde a small amount of catalyst or condensing agent for the polymerization reaction. Such catalysts or condensing agents are usually materials which are basic in nature. Of these sodium hydroxide is most commonly employed and may be added in any desired amount according to the special character of the solution in which it is to be used. The preferred concentration, however, is between 0.02 and 0.5 per cent by weight. Other substances than sodium hydroxide may, of course, be used such as for example, potassium hydroxide, ammonium hydroxide, various aliphatic amines and the like depending to some extent upon the nature of the polyphenol, the additional compound capable of polymerizing with an aldehyde and the aldehyde used.

While treatment of rayon with such an aqueous solution of resin forming materials as has been described with subsequent polymerization of these materials to a substantially infusible, insoluble interpolymeric synthetic resin on and probably in the cellulosic structure improves the adhesion of rayon to rubber it is preferred according to this invention to employ the treatment with an aqueous solution of resin forming materials in combination with dispersed rubber or rubber latex as giving still more marked improvement in adhesion. This may be accomplished in a number of ways, the simplest and most convenient of which contemplates the combination of an aqueous dispersion of rubber or rubber latex with the aqueous solution of resin forming materials before application to the rayon. The latex or rubber may be present in the solution for treating the rayon in any desired proportion although the improvement in adhesion is most marked when concentrations of rubber or latex solids are used which are between 5 and 40% by weight and preferably between 10 and 25% by weight. If a natural latex dispersion is used it may be either crude latex or latex which contains added materials or which has been treated to alter the character of the rubber in it, for instance by degradation or oxidation or both. For instance, it may contain any desired accelerators, vulcanizers, stabilizers, dispersing agents or any other substances such as are commonly used in the rubber industry. When rubber is used as an artificial dispersion in water of either natural rubber or of any known synthetic rubber it may likewise contain additionally such substances as rubber accelerators, vulcanizers, stabilizers, dispersing agents and the like. The type or kind of rubber dispersion or rubber latex to be used depends to some extent upon the type or kind of rubber stock to which it is desired to bond the treated rayon. For example, to obtain good adhesion between treated rayon and synthetic rubber composed of halogen-2-butadiene-1,3 polymer, e. g. chloro-2-butadiene-1,3 polymer, stock it is preferable to treat the rayon with an aqueous solution of resin forming materials in combination with halogen-2-butadiene-1,3 polymer latex. The thread treating composition may also contain other materials such as casein, glutinous materials, water-soluble adhesives, wetting agents, and the like, which may be added as adhesives, stabilizers, or for a variety of purposes without departing from the fundamental principle of this invention.

Variations in the procedure for preparing an aqueous solution containing a polyphenol, an additional compound capable of polymerizing with an aldehyde, an aldehyde, a suitable catalyst and dispersed rubber or rubber latex may be employed depending upon the concentration of the resin forming materials and rubber solids desired in the finished composition or depending upon the ratio of resin forming materials to rubber solids or depending upon the specific resin forming materials used. The simplest and most convenient method consists in dissolving the polyphenol, an additional compound capable of polymerizing with an aldehyde, aldehyde and catalyst in water and stirring the solution of resin forming materials into the aqueous dispersion of rubber or rubber latex. In certain cases it may be desirable to employ instead of a freshly prepared solution of the resin forming materials a solution containing the partially polymerized resin, prepared by allowing a solution containing the polyphenol, an additional compound capable of polymerizing with an aldehyde, aldehyde and catalyst to stand at a temperature of from 25° to 30° C. for from 5 to 20 hours during which time gradual condensation of the phenol and aldehyde and polymerization of the product takes place. This condensation and polymerization may likewise be carried out by heating the solution containing the resin forming materials at an elevated temperature. The use of a partially polymerized resin solution is preferred in certain cases such as for example in case a high solids concentration of resin forming material and dispersed rubber or rubber latex is desired at which concentration there may be a tendency for a freshly prepared solution of a polyphenol, an additional compound capable of polymerizing with an aldehyde, aldehyde and catalyst to coagulate or precipitate the dispersion of rubber or rubber latex to which it is added.

Instead of applying dispersed rubber or rubber latex to the cord together with the resin forming materials in a single step from an aqueous solution which contains both the resin forming materials and the dispersed rubber or rubber latex this invention also contemplates as a method for improving the adhesion of rayon to rubber the steps of treating the rayon with an aqueous solution of the resin forming materials subsequently drying the cord at a temperature sufficient to cause the polymerization of the resin and then treating the resulting resin coated rayon with a solution of rubber in toluene or other suitable rubber solvent, drying the so treated cord to evaporate the solvent so that the cord has a coating of resin and on that a coating of rubber. The rubber solution used may be a solution of either natural or synthetic rubber and may be either raw rubber or rubber compounded with any of the usual accelerators, vulcanizers, stabilizers and the like which are commonly added to rubber or of rubber degraded, oxidized or otherwise modified.

Other variations in the method of applying to rayon cord a substantially insoluble, infusible interpolymeric synthetic resin and rubber or rubber latex to improve the adhesion of the cord to rubber are also possible according to this invention. For instance the cord may be treated first with an aqueous solution of a polyphenol, an additional compound capable of polymerizing with an aldehyde, an aldehyde and a suitable catalyst and dried at a temperature to polymerize the resin and then with an aqueous solution containing a polyphenol, an additional compound capable of polymerizing with an aldehyde, an aldehyde and a suitable catalyst to which dispersed rubber or rubber latex has also been added. Or the rayon cord may be given two treatments the first with an aqueous solution of a polyphenol, an additional compound capable of polymerizing with an aldehyde, an aldehyde and a suitable catalyst and dispersed rubber or rubber latex and then with the same aqueous solution of resin forming materials containing dispersed rubber or rubber latex or with a different aqueous solution of resin forming materials containing dispersed rubber or rubber latex and containing a different ratio of resin forming materials to rubber solids. It is understood that after each aqueous treatment the cord is dried before the application of the next successive treatment.

The application of a composition containing a polyphenol, an additional compound capable of polymerizing with an aldehyde, an aldehyde and a suitable catalyst and a dispersion of rubber or rubber latex from an aqueous solution to rayon cord or fabric may be accomplished in a number of ways. For example the rayon cord or fabric may be passed through the composition contained in a tank then between two doctor knives or squeeze rolls to remove the excess composition from the cord or fabric and thence over a series of dryer rolls maintained at a temperature sufficiently high to dry out the cord or fabric and to condense or polymerize the resin. At some stage of the drying process the temperature of the treated cord or fabric should be raised to from 85 to 100° C. to insure complete condensation or polymerization of the resin forming materials. Other equally suitable means for applying the composition containing the resin forming materials and rubber to rayon cord or fabric may be employed such as by means of transfer rolls, by spraying, brushing, etc. Likewise drying of the treated rayon cord or fabric may be accomplished in other ways such as for example by means of a belt or frame carrying the treated rayon cord or fabric through a heated closed chamber, etc.

If rayon tire cord, treated with an aqueous dispersion containing a polyphenol, an additional compound capable of polymerizing with an aldehyde, an aldehyde and a suitable catalyst and a rubber dispersion or rubber latex and dried at an elevated temperature in the manner described by this invention is placed upon a commercial compounded rubber stock such as is customarily used in the manufacture of tires and the whole is cured at high pressure and elevated temperature sufficient to vulcanize the rubber stock completely the treated rayon cord is found to strongly adhere to the rubber. Indeed if the cord is subjected to a standard pull-out test which measures the force required to separate the cord from the rubber and therefore constitutes a measure of the adhesion between the cord and rubber it is found that the adhesion between the treated rayon and rubber is at least equal to and often greater than that obtained between cotton and rubber and may be two or even more times better than the adhesion between untreated rayon and rubber. If the treated rayon cord is subjected to a standard pull-out test at an elevated temperature for example at 270° F. to measure the adhesion between the cord and rubber at this temperature the adhesion is found to be equal to and often better than the adhesion of cotton cord to rubber at this temperature, a fact which is of utmost importance in the construction of tires, fan belts and similar articles which develop a high temperature under ordinary conditions of usage. This constitutes a great advantage in the above described treatment over a number of other adhesion treatments which when applied to rayon result in a treated cord with good adhesion to rubber at room temperature but with poor adhesion to rubber at an elevated temperature.

In addition to improving the adhesion of rayon to rubber by treating the rayon with an aqueous solution of a polyphenol, an additional compound capable of polymerizing with an aldehyde, an aldehyde and a suitable catalyst and containing dispersed rubber or rubber latex as hereinbefore described, this treatment greatly increases the length of time a pad consisting of plies of so treated cords or fabric to which a skim coat of compounded rubber stock has been applied and the whole subjected to sufficient pressure and temperature to completely vulcanize the rubber may be flexed and bent under tension before separation of the plies takes place. For example, where such a pad prepared from untreated rayon may be flexed 2000 times and a similar pad prepared from cotton may be flexed 17,000 times before separation of the plies takes place a similar pad prepared from rayon treated according to the teaching of this invention may be flexed 100,000 times before separation of the plies takes place, a fact which is of utmost importance in the construction of tires.

Furthermore, rayon cord treated according to this invention in order to improve its adhesion to rubber undergoes no marked decrease in fatigue resistance. Fatigue resistance of a tire cord is measured in a variety of ways in one of which the cord is subjected for a fixed number of flexings to drastic conditions of flexing and simultaneous stretching at an elevated temperature which conditions approximate those encountered during the actual use of tires. The tensile strength of the cord after the prescribed flexing and stretching compared with the tensile strength before the test gives a measure of the fatigue resistance of the cord. For rayon cord treated according to this invention the drop in tensile strength after the fatigue resistance test is very slight whereas cotton cord loses its tensile strength entirely when subjected to the same test. This improved resistance to fatigue at elevated temperatures exhibited by rayon cord treated according to this invention is a great advantage in cord designed for use in tires, fan belts and the like which develop a high temperature under ordinary conditions of usage and at the same time undergo constant and severe flexing, bending and stretching.

In addition to the foregoing advantages in the use of an aqueous solution of polyphenol, an additional compound capable of polymerizing with an aldehyde, an aldehyde and a suitable catalyst combined with a dispersion of rubber or rubber latex for improving the adhesion of rayon to rubber is the fact that this treatment does not excessively stiffen or harden the rayon cord or fabric which is treated. Other advantages are the ease with which the treatment may be applied to rayon cord or fabric which makes unnecessary any changes in equipment in current commercial processes in use for the treatment of fabrics or individual cords and the cheapness and ready availability of the raw materials.

It is to be understood that although the application of an interpolymeric synthetic resin either alone or in combination with dispersed rubber or rubber latex has been largely described herein as a means of improving the adhesion of rayon tire core or fabric to rubber, this method is by no means limited to these specific cellulosic structures. An interpolymeric resin either alone or in combination with dispersed rubber or rubber latex is equally useful for adhering rubber to a great variety of cellulosic structures such as for example regenerated cellulose or cellulose precipitated from an aqueous dispersion in the form of films, tubing, straw, ribbons, sponges and the like; also, for adhering rubber to staple rayon, bristles, artificial horsehair and the line.

In order more clearly to illustrate this invention the following examples are given. It is, of course, to be understood that the invention is not limited to these precise examples which are merely illustrative of the invention. Obviously various other modifications will occur to those skilled in the art which, however, do not depart from the spirit and nature of this invention.

*Example I*

An aqueous solution is prepared containing 1% by weight of resorcinol, 1% by weight of phenol, 2% by weight of formaldehyde (added as 2½ times that amount of 40% commercial formaldehyde) 0.2% by weight of sodium hydroxide and 10% by weight of rubber latex solids containing suitable accelerators, vulcanizers, stabilizers etc. Cord made from viscose process rayon and of construction suitable for use in automobile tires, for example, cord made from rayon thread having a dry tenacity at room temperature (75° F.) of about 3 grams per denier and prepared as described in copending application of Harold H. Parker, Serial No. 676,463, filed June 19, 1933, is passed through this solution slowly enough to be thoroughly wet and is then dried at a temperature of 85° C. or higher by passage over heated rollers or by other suitable means and is then laid upon a thin sheet of compounded rubber stock and the whole subjected to sufficient temperature and pressure to completely vulcanize the rubber. After curing the rayon cord is found to adhere very firmly to the rubber so that a force is required to separate it which is at least twice as great as is required for bare untreated rayon and is approximately equal to or greater than that required in case of untreated cotton cord used in the manufacture of tires.

When rayon tire cord is passed through the following solutions, dried, applied to compounded rubber stock and the cord and rubber cured or vulcanized as described in Example I a product is obtained exhibiting good adhesion between the rayon cord and rubber.

*Example II*

An aqueous solution containing 1.2% by weight of resorcinol, 0.6% by weight of thiourea, 1.5% by weight of formaldehyde (added as 2½ times that amount of 40% commercial formaldehyde), 0.3% by weight of sodium hydroxide and 15% by weight of natural rubber latex solids.

*Example III*

An aqueous solution containing 0.5% by weight of resorcinol, 3% by weight of dimethylol urea, 1.3% by weight of formaldehyde (added as 2½ times that amount of 40% commercial formaldehyde), 0.3% by weight of sodium hydroxide and 15% by weight of natural rubber latex solids.

*Example IV*

An aqueous solution containing 0.5% by weight of resorcinol, 1.5% by weight of aniline, 1.6% by weight of formaldehyde (added as 2½ times that amount of 40% commercial formaldehyde), 0.3% by weight of sodium hydroxide and 15% by weight of rubber latex solids containing suitable accelerators, vulcanizers, stabilizers, etc.

*Example V*

An aqueous solution containing 1% by weight of phloroglucinol, 2% by weight of methyl ethyl ketone, 1.6% by weight of formaldehyde (added as 2½ times that amount of 40% commercial formaldehyde), 0.3% by weight of sodium hydroxide and 15% by weight of natural rubber latex solids.

*Example VI*

An aqueous solution containing 1% by weight of resorcinol, 1% by weight of phloroglucinol, 1.7% by weight of formaldehyde (added as 2½ times that amount of 40% commercial formaldehyde), 0.3% by weight of sodium hydroxide and 15% by weight of natural rubber latex solids.

*Example VII*

An aqueous solution containing 1% by weight of resorcinol, 0.5% by weight of cyanamide, 1.5% by weight of formaldehyde (added as 2½ times that amount of 40% commercial formaldehyde), 0.3% by weight of sodium hydroxide and 15% by weight of rubber latex solids containing suitable accelerators, vulcanizers, stabilizers, etc.

A particularly good latex for use according to the methods described comprises a so-called creamed latex prepared by treating natural rubber latex with soap, ammonium alginate, and the like, creaming as by whipping or other vigorous agitation at a temperature of 70-90° C., skimming, and using the top portion which has been skimmed off. The creamed latex is then used in the same way as the various latices disclosed in the examples.

Instead of drying the cord at elevated temperatures as set forth in the preceding examples, the impregnated cord may be dried at room temperature or thereabouts, and subsequently vulcanized to the rubber at the customary temperature.

Parts and proportions are intended to be parts and proportions by weight unless otherwise indicated.

Since it is obvious that many changes and modifications of the invention can be made within the nature and spirit thereof, it is to be understood that the invention is not to be limited thereto except as set forth in the appended claims.

I claim:

1. In the process of manufacturing reinforced rubber articles such as rubber tires and the like, the steps which comprise treating threads, cords, fabrics, and the like prepared from continuous artificial cellulosic filaments with an aqueous solution containing, as essential bonding ingredients, a phenol, at least one other material capable of setting up with an aldehyde to form an infusible insoluble resin, and sufficient aldehyde to react with said phenol and said other material to form an infusible, insoluble resin, treating the threads, cords, fabrics, and the like to convert at least a portion of the resin-forming materials to an infusible, insoluble resin, associating the article so treated with vulcanizable rubber, and then subjecting the mass to a vulcanizing temperature.

2. In the process of manufacturing reinforced rubber articles such as rubber tires and the like, the steps which comprise treating threads, cords, fabrics, and the like prepared from continuous regenerated cellulose filaments having a dry tenacity at room temperature of above two grams per denier with an aqueous solution containing, as essential bonding ingredients, a phenol, at least one other material capable of setting up with an aldehyde to form an infusible insoluble resin, and sufficient aldehyde to react with said phenol and said other material to form an infusible, insoluble resin, treating the threads, cords, fabrics, and the like to convert at least a portion of the resin-forming materials to an infusible, insoluble resin, associating the article so treated with vulcanizable rubber, and then subjecting the mass to a vulcanizing temperature.

3. In the process of manufacturing reinforced rubber articles such as rubber tires and the like, the steps which comprise treating threads, cords, fabrics, and the like prepared from continuous regenerated cellulose filaments having a dry tenacity at room temperature of above two grams per denier with an aqueous solution containing, as essential bonding ingredients, a polyhydric phenol, at least one other material capable of setting up with an aldehyde to form an infusible, insoluble resin, and sufficient aldehyde to react with said phenol and said other material to form an infusible, insoluble resin, treating the threads, cords, fabrics, and the like to convert at least a portion of the resin-forming materials to an infusible, insoluble resin, associating the article so treated with vulcanizable rubber, and then subjecting the mass to a vulcanizing temperature.

4. In the process of manufacturing reinforced rubber articles such as rubber tires and the like, the steps which comprise treating threads, cords, fabrics, and the like prepared from continuous regenerated cellulose filaments having a dry tenacity at room temperature of above two grams per denier with an aqueous solution containing, as essential bonding ingredients, rubber latex together with a polyhydric phenol, at least one other material capable of setting up with an aldehyde to form an infusible, insoluble resin, and sufficient aldehyde to react with said phenol and said other material to form an infusible, insoluble resin, treating the threads, cords, fabrics, and the like to convert at least a portion of the resin-forming materials to an infusible, insoluble resin, associating the article so treated with vulcanizable rubber, and then subjecting the mass to a vulcanizing temperature.

5. In the process of manufacturing reinforced rubber articles such as rubber tires and the like, the steps which comprise treating threads, cords, fabrics, and the like prepared from continuous regenerated cellulose filaments having a dry tenacity at room temperature of above two grams per denier with an aqueous solution containing, as essential bonding ingredients, rubber latex together with a polyhydric phenol, at least one other material capable of setting up with formaldehyde to form an infusible, insoluble resin and sufficient formaldehyde to react with said phenol and said other material to form an infusible, insoluble resin and a resin-forming catalyst, heating the threads, cords, fabrics, and the like, so treated, at a temperature sufficiently elevated to convert at least a portion of the resin-forming materials to an infusible, insoluble resin, associating the article so treated with vulcanizable rubber, and then subjecting the mass to a vulcanizing temperature.

6. In the process of manufacturing reinforced rubber articles such as rubber tires and the like, the steps which comprise treating threads, cords, fabrics, and the like prepared from continuous regenerated cellulose filaments having a dry tenacity at room temperature of above two grams per denier and obtained from viscose, with an aqueous solution containing, as essential bonding ingredients, rubber latex together with resorcinol, phenol and sufficient formaldehyde to react with the resorcinol and phenol to form an infusible, insoluble resin and an alkaline catalyst, heating the threads, cords, fabrics, and the like, so treated, at a temperature sufficiently elevated to convert at least a portion of the resin-forming materials to an infusible, insoluble resin, associating the article so treated with vulcanizable rubber, and then subjecting the mass to a vulcanizing temperature.

7. In the process of manufacturing reinforced rubber articles such as rubber tires and the like, the steps which comprise treating threads, cords, fabrics, and the like prepared from continuous artificial cellulosic filaments with an aqueous solution containing, as essential bonding ingredients, a phenol, at least one other material capable of setting up with an aldehyde to form an infusible, insoluble resin, and sufficient aldehyde to react with said phenol and said other material to form an infusible, insoluble resin, drying the threads, cords, fabrics, and the like so treated, plying the same with sheets of commercial compounded vulcanizable rubber, and then subjecting the mass to a vulcanizing temperature.

8. In the process of manufacturing reinforced rubber articles such as rubber tires and the like, the steps which comprise treating threads, cords, fabrics, and the like prepared from continuous regenerated cellulose filaments having a dry tenacity at room temperature of above two grams per denier with an aqueous solution containing, as essential bonding ingredients, a phenol, at least one other material capable of setting up with an aldehyde to form an infusible, insoluble resin, and sufficient aldehyde to react with said phenol and said other material to form an infusible, insoluble resin, drying the threads, cords, fabrics, and the like so treated, plying the same with sheets of commercial compounded vulcanizable rubber, and then subjecting the mass to a vulcanizing temperature.

9. In the process of manufacturing reinforced rubber articles such as rubber tires and the like, the steps which comprise treating threads, cords, fabrics, and the like prepared from continuous regenerated cellulose filaments having a dry tenacity at room temperature of above two grams per denier with an aqueous solution containing, as essential bonding ingredients, a polyhydric phenol, at least one other material capable of setting up with an aldehyde to form an infusible, insoluble resin, and sufficient aldehyde to react with said phenol and said other material to form an infusible, insoluble resin, drying the threads, cords, fabrics, and the like so treated, plying the same with sheets of commercial compounded vulcanizable rubber, and then subjecting the mass to a vulcanizing temperature.

10. In the process of manufacturing reinforced rubber articles such as rubber tires and the like, the steps which comprise treating threads, cords, fabrics, and the like prepared from continuous regenerated cellulose filaments having a dry tenacity at room temperature of above two grams per denier with an aqueous solution containing, as essential bonding ingredients, rubber latex together with a polyhydric phenol, at least one other material capable of setting up with an aldehyde to form an infusible, insoluble resin, and sufficient aldehyde to react with said phenol and said other material to form an infusible, insoluble resin, and a resin-forming catalyst, drying the threads, cords, fabrics, and the like so treated, plying the same with sheets of commercial compounded vulcanizable rubber, and then subjecting the mass to a vulcanizing temperature.

11. Vulcanized rubber articles such as rubber tires and the like, reinforced with threads, cords, fabrics, and the like, prepared from continuous regenerated cellulose filaments having a dry tenacity at room temperature of above two grams per denier, said threads, cords, fabrics, and the like being adhered to the vulcanized rubber in said articles by means of a composition comprising, as an essential bonding ingredient, an infusible, insoluble, interpolymeric resin, said resin resulting from the reaction of an aldehyde with a polyphenol and at least one other compound capable of reacting with the aldehyde to form a synthetic resin.

12. Vulcanized rubber articles such as rubber tires and the like, reinforced with threads, cords, fabrics, and the like, prepared from continuous regenerated cellulose filaments having a dry tenacity at room temperature of above two grams per denier, said threads, cords, fabrics, and the like being adhered to the vulcanized rubber in said articles by means of a composition comprising, as essential bonding ingredients, an infusible, insoluble, interpolymeric resin and rubber, said resin resulting from the reaction of an aldehyde with a polyphenol and at least one other compound capable of reacting with the aldehyde to form a synthetic resin.

ALBERT HERSHBERGER.